Nov. 10, 1942.   A. H. MANTYLA   2,301,555
TRUCK HOIST
Filed July 18, 1941   3 Sheets-Sheet 1
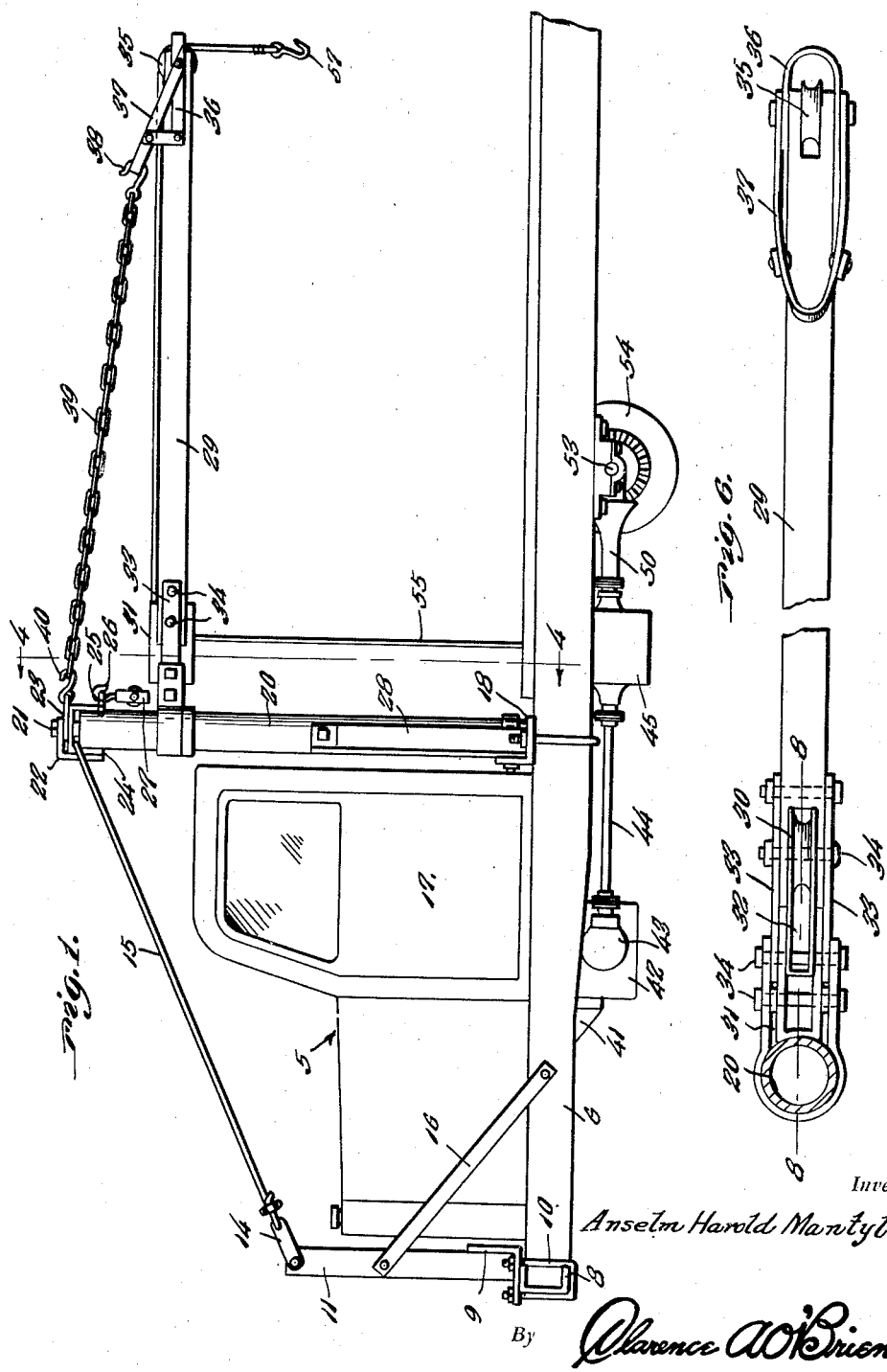
Inventor
Anselm Harold Mantyla
By Clarence A. O'Brien
Attorney Nov. 10, 1942.   A. H. MANTYLA   2,301,555
TRUCK HOIST
Filed July 18, 1941   3 Sheets-Sheet 2
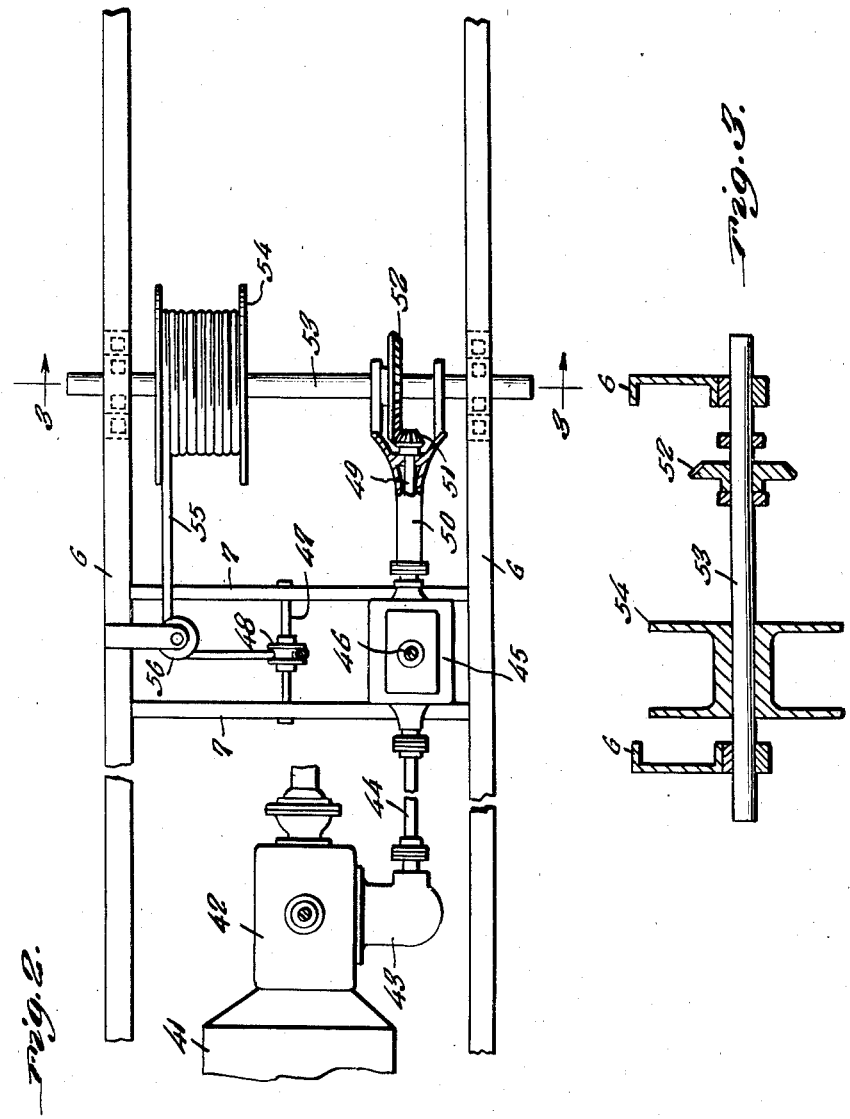
Inventor
Anselm Harold Mantyla
By Clarence A. O'Brien
Attorney Nov. 10, 1942.    A. H. MANTYLA    2,301,555
TRUCK HOIST
Filed July 18, 1941    3 Sheets—Sheet 3
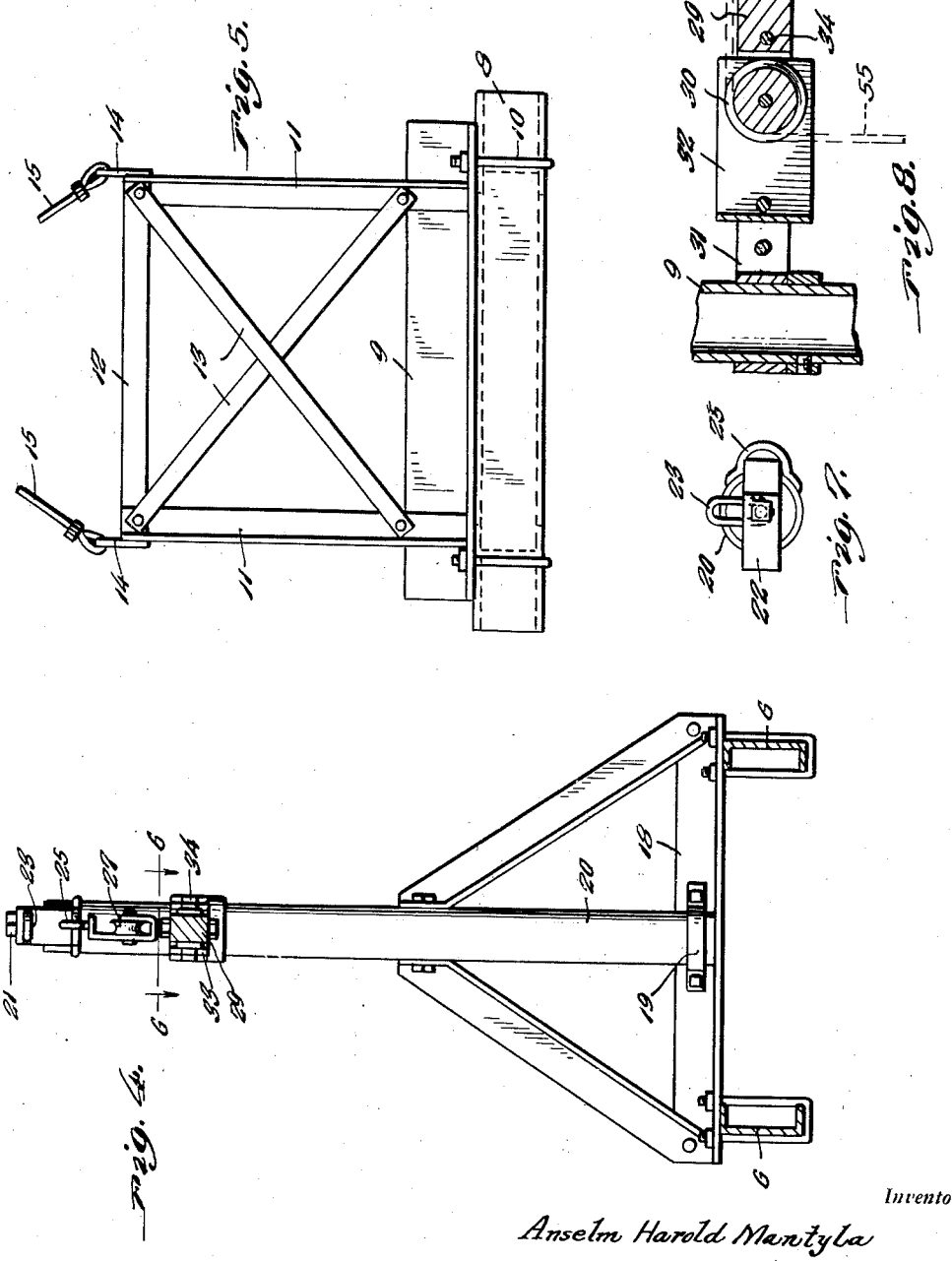
Inventor
Anselm Harold Mantyla
By Clarence A. O'Brien
Attorney Patented Nov. 10, 1942

2,301,555

UNITED STATES PATENT OFFICE 2,301,555

TRUCK HOIST

Anselm Harold Mantyla, Ishpeming, Mich.

Application July 18, 1941, Serial No. 403,061

1 Claim. (Cl. 212—65)

This invention relates to new and useful improvements in hoists for trucks and similar vehicles, the principal object of the invention being to provide a load lifting apparatus which due to its peculiar construction has an increased load capacity over present day lifting apparatus of substantially equivalent dimensions.

Another important object of the invention is to provide a lifting apparatus of the character stated which is sturdy in construction, durable and not apt to become readily out of order.

Other objects and advantages of the invention will become apparent to the reader of the following specification.

In the drawings:

Figure 1 represents a side elevational view showing a truck bed and tab and the hoist mounted thereon.

Figure 2 is a fragmentary top plan view of a truck chassis showing the drive means installed.

Figure 3 is a section on the line 3—3 of Figure 2.

Figure 4 is a vertical sectional view taken substantially on the line 4—4 of Figure 1.

Figure 5 is a front elevational view of the bracing frame.

Figure 6 is a sectional view taken substantially on the line 6—6 of Figure 4.

Figure 7 is a side elevational view of one of the pulleys.

Figure 8 is a sectional view taken substantially on the line 8—8 of Figure 6.

Referring to the drawings wherein like numerals designate like parts, it can be seen that numeral 5 generally refers to a truck which includes a chassis. This chassis consists of longitudinal frame members 6, 6 connected by transverse struts 7. The forward ends of the side frame members 6 are connected by a U-beam 8 upon which is secured an angle iron beam 9 by U-clamps 10. Suitably secured to the angle beam 9 are angular uprights 11, 11 bridged at their upper ends by a member 12 and having crossed brace members 13 connecting the ends thereof. Eye members 14 are provided at the upper ends of the uprights 11, 11 from which extend guy cables 15. Brace members 16 extend from the side portions of the uprights 11 to the chassis frame members 6.

Numeral 17 denotes a cab rearwardly of which and bridging the frame members 6 is an angle bar 18 having a collar 19 thereon embracing the lower portion of a tubular post 20 the upper end of which has a bolt 21 screwed into the same and downwardly through an angle member 22, a link 23 and a U-shaped cap member 24. The U-shaped cap member 24 embraces the slide portion of the upper end of the post 20. An eye 25 extends laterally from the upper portion of the post and through this is disposed a hook 26 at the upper portion of a pulley unit 27. The cable 15 extends from the aforementioned eyes 14 through the U-shaped cap member 24, thus bracing the post 20 from the front.

Angular brace members 28 extend upwardly from the angle beam 18 and are secured by bolts or the like to the intermediate portion of the post 20 thus bridging from the sides.

Numeral 29 denotes a horizontal beam, the inner end of which is bifurcated to receive a pulley 30. Numeral 31 denotes a U-shaped spacer one end of which is curved to conform with the curvature of the post 20 while its other end is bifurcated to receive one end portion of a U-shaped guide 32 which extends from within the bifurcated end of the beam 29. The bifurcated ends of the spacer 31 and beam 29 meet and side straps 33, 33 bridge these end portions of the block 31 and beam 29 and are secured to the spacer and beam by bolts 34 passing through the same.

The free end of the beam 29 is bifurcated and has a pulley 35 mounted therein. Numeral 36 represents a U-shaped cable guide which is suitably secured to the forward end of the beam 29 and extends outwardly of the pulley 35. A bail 37 extends from the forward end of the beam 29 rearwardly and is engaged by a hook 38 at the forward end of a chain 39, the rear end of which is engaged over a hook 40 connected to the link 23 at the upper end of the post 20. Thus the beam 29 is supported in a substantially horizontal position.

Referring now to Figure 2, it can be seen that numeral 41 denotes the motor of the truck 5 rearwardly of which is the main transmission 42. Laterally of the transmission 42 is a power take-off 43 such as is found on many types of trucks and from which extends a shaft 44 to a supplemental transmission 45 having a control 46. The transmission 45 is mounted between the struts 7, 7 as is a shaft 47 on which is a pulley 48. Numeral 49 denotes a driven shaft extending through a housing 50 and equipped with a pinion 51 in driving engagement with a gear 52 on a shaft 53, on which shaft is located a reel 54 on which a cable 55 is wound. This cable extends from the reel against a pulley 56 on one frame member 6 and from there under the pulley 48 to extend upwardly where it passes through the guide 32 in the beam 29 and over the pulley 30, and then forwardly to pass downwardly over the forward pulley 35 and have a hook or other suitable device 57 at its free end. Of course, if desired, the cable can be passed upwardly and over the pulley 27 in handling certain kinds of work or other certain conditions. Obviously, the transmission control 46 will be located outside of the cab 17 so that it can be readily handled as the operator observes the work handling operations.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A hoist comprising a post, a horizontal beam, means for attaching one end of the beam to the post, said means comprising a U-shaped clamp member for embracing the post, said U-shaped clamp member provided with parallel legs, a U-shaped member adapted to have its bight portion abutting the post and being interposed between the leg portions of the clamp member, a pulley box partly disposed into the second-mentioned U-shaped member, the adjacent end of the beam being bifurcated to receive the remaining portion of the pulley box, straps interlapping the said referred to end of the beam and second-mentioned U-shaped member, securing means disposed through the straps, U-shaped members, box, and bifurcated beam end, and a pulley at the remaining end of the beam.

ANSELM HAROLD MANTYLA.